(12) United States Patent
Kikuchi et al.

(10) Patent No.: US 9,810,008 B2
(45) Date of Patent: Nov. 7, 2017

(54) LOCK SECTION STRUCTURE

(71) Applicant: CALSONIC KANSEI CORPORATION, Saitama-shi, Saitama (JP)

(72) Inventors: Masami Kikuchi, Saitama (JP); Tetsuji Ogawa, Saitama (JP)

(73) Assignee: CALSONIC KANSEI CORPORATION, Saitama-Shi (JP)

( * ) Notice: Subject to any disclaimer, the term of this patent is extended or adjusted under 35 U.S.C. 154(b) by 170 days.

(21) Appl. No.: 14/655,152

(22) PCT Filed: Dec. 9, 2013

(86) PCT No.: PCT/JP2013/082912
§ 371 (c)(1),
(2) Date: Jun. 24, 2015

(87) PCT Pub. No.: WO2014/103672
PCT Pub. Date: Jul. 3, 2014

(65) Prior Publication Data
US 2016/0194907 A1    Jul. 7, 2016

(30) Foreign Application Priority Data
Dec. 25, 2012  (JP) ................................. 2012-281240

(51) Int. Cl.
*E05C 3/14* (2006.01)
*B60R 7/06* (2006.01)
(Continued)

(52) U.S. Cl.
CPC .................. *E05C 3/14* (2013.01); *B60R 7/06* (2013.01); *E05B 83/28* (2013.01); *E05C 3/002* (2013.01);
(Continued)

(58) Field of Classification Search
CPC ................ Y10S 292/37; Y10S 292/04; Y10T 292/0986; Y10T 292/0995; Y10T 292/106; E05C 19/022
(Continued)

(56) References Cited

U.S. PATENT DOCUMENTS

| 5,570,915 A * | 11/1996 | Asadurian ........... E05B 17/0037 |
| | | 292/216 |
| 7,347,460 B2 * | 3/2008 | Ala ..................... A47L 15/4259 |
| | | 292/216 |
| 7,806,446 B2 | 10/2010 | Oh |

FOREIGN PATENT DOCUMENTS

| CN | 1530258 A | 9/2004 |
| CN | 101195359 A | 6/2008 |

(Continued)

*Primary Examiner* — Mark Williams
(74) *Attorney, Agent, or Firm* — Foley & Lardner LLP

(57) ABSTRACT

A storage device 1 has a storage device body 2 and an opening and closing member 4, which are supported to be capable of pivoting about the center of opening and closing movement, the center being provided on one side. A lock mechanism 13 is provided on the other side of both the storage device body 2 and an opening 3. The lock mechanism 13 is provided with a lock member 16, an unlocking button 17, a cam mechanism 18, and a biasing member 19. The lock member 16 is a pivotable member 22 capable of pivoting about a lock pivot shaft 21. The opening and closing member 4 has a pressure receiving portion 52 on the inner surface side thereof, and the pressure receiving portion 52 is pushed out in an opening direction 23 by the lock member 16 which is caused to pivot in an unlocking direction.

3 Claims, 9 Drawing Sheets

(51) Int. Cl.
  *E05C 3/30* (2006.01)
  *E05B 83/28* (2014.01)
  *E05C 3/00* (2006.01)
  *E05C 19/10* (2006.01)
  *E05B 83/30* (2014.01)
  *E05C 3/12* (2006.01)

(52) U.S. Cl.
  CPC ............... *E05C 3/30* (2013.01); *E05C 19/10* (2013.01); *E05B 83/30* (2013.01); *E05C 3/124* (2013.01)

(58) Field of Classification Search
  USPC ........................................................ 292/242
  See application file for complete search history.

(56) References Cited

FOREIGN PATENT DOCUMENTS

| | | |
|---|---|---|
| JP | 11-159215 A | 6/1999 |
| JP | 2005-325555 A | 11/2005 |
| KP | 100693742 B1 | 3/2007 |

\* cited by examiner

LOCK SECTION STRUCTURE

TECHNICAL FIELD

The present invention relates to a lock section structure adapted to certainly achieve locking without being affected by the layout of various parts.

BACKGROUND OF THE INVENTION

A vehicle such as an automotive vehicle is provided with storage devices at various locations in the interior.

As the storage devices, there exist those having a storage device body and an opening and closing member adapted to open or close an opening with which the storage device body is formed, the storage device body and the opening and closing member being supported to be capable of pivoting about an opening/closing center axis portion disposed on one side.

To such storage devices, there is provided a lock mechanism for allowing locking and unlocking, on the other side of both the storage device body and the opening and closing member.

The lock mechanism is provide to include: a lock member having an engaging surface at which the lock member can engage with or disengage from an accepting portion provided to the opening and closing member; an unlocking button capable of being pushed against the storage device body; a cam mechanism adapted to move the lock member linearly by a push of the unlocking button thereby disengaging the lock member from the accepting portion; and a biasing member for constantly biasing the lock member toward a locking direction (for example, as discussed in Patent Publication 1).

REFERENCES ABOUT PRIOR ART

Patent Documents

Patent Publication 1: Japanese Patent Application Publication No. H11-159215

SUMMARY OF THE INVENTION

Problems to be Solved by the Invention

However, drawbacks as follows have been encountered in the lock section structure discussed in Patent Publication 1.

More specifically, in the storage device as discussed in Patent Publication 1, an opening direction toward which the opening and closing member under a closed state can open coincides with a pushing direction of the unlocking button; therefore it is easy to make the direction of the accepting portion and the engaging surface perpendicular to the opening direction, but it has been difficult to make the direction of the accepting portion and the engaging surface perpendicular to the opening direction in a case where the opening direction toward which the opening and closing member under a closed state can open and the pushing direction of the unlocking button are largely apart from each other for a convenience of layout, for example.

If the direction of the accepting portion and the engaging surface cannot be made perpendicular to the opening direction, a substantial engaging amount therebetween should be reduced to weaken the engaging force between the accepting portion and the engaging surface. They may cause a failure in engagement and there arises a fear that locking is not certainly attained.

Moreover, in the case where the lock member is adapted to move linearly in order to attain locking or unlocking, a movable space of the lock member becomes wider. According to the increased amount of the movable space, the size of the lock mechanism is also increased.

In the case where the lock member is adapted to move linearly in order to attain locking or unlocking, furthermore, it becomes structurally difficult to give some contrivance to reduce a pushed amount of the unlocking button while increasing a moved amount of the engaging surface. In other words, it becomes difficult to ensure a high engaging amount between the accepting portion and the engaging surface while decreasing the pushed amount of the unlocking button. The pushed amount of the unlocking button is necessarily increased and, according to the increased amount, frictions occur onto various surfaces of parts. Hence an operational feeling is not so good and additionally an operation noise tends to increase.

Means for Solving the Problems

In view of the above problems, an object of the invention as claimed in claim 1 is to provide a lock section structure comprising: a storage device comprising a storage device body and an opening and closing member adapted to open or close an opening with which the storage device body is formed, the storage device body and the opening and closing member being supported to be capable of pivoting about an opening/closing center axis portion disposed on one side; and a lock mechanism for allowing locking and unlocking, provided on the other side of both the storage device body and the opening and closing member. The lock mechanism comprises a lock member having an engaging surface at which the lock member can engage with or disengage from an accepting portion provided to the opening and closing member, on unlocking button capable of being pushed against the storage device body, a cam mechanism adapted to disengage the lock member from the accepting portion by a push of the unlocking button, and a biasing member for constantly biasing the lock member toward a locking direction. The lock member is characterized by behaving as a pivotable member pivotable about a lock pivot shaft, and characterized in that the engaging surface of the lock member and the accepting portion of the opening and closing member form a plane perpendicular to an opening direction toward which the opening and closing member under a closed state can open about the opening/closing center axis portion.

Another object of the invention as claimed in claim 2 is to provide a lock section structure wherein the opening and closing member forms a vertical surface, the opening and closing member is locked at its upper side by the lock mechanism when downwardly pivoted about the opening/closing center axis portion disposed on the lower side, the opening/closing center axis portion is located on the backward side in the storage device body, with which the opening direction toward which the opening and closing member under a closed state can open is directed forwardly downwardly, and a pushing direction of the unlocking button is backwardly downwardly.

A further object of the invention as claimed in claim 3 is to provide a lock section structure wherein the lock mechanism further comprises a holder member attachable to the storage device body, the holder member allows the lock pivot shaft to be pivotally supported, a cam follower constituting the cam mechanism is disposed on the lock member at a location forward from a part pivotally supported by the lock pivot shaft, the unlocking button has, at its backward position, a cam plate extending in the pushing direction, the cam plate is formed with a cam surface for guiding the cam follower with respect to the cam plate to rotationally move the lock member toward an unlocking direction, and the biasing member is provided to interpose between the storage device body or the holder member and the lock member.

A still further object of the invention as claimed in claim 4 is to provide a lock section structure wherein the lock member is provided to include at its backward part a bearing section extending in the pushing direction to support the lock pivot shaft, the lock member is further provided with, at is forward part, a locking arm section extending toward the accepting portion while having the engaging surface at its end, thereby taking a mountain-like shape in a side view, and the lock member taking a mountain-like shape in a side view has a bending section between the bearing section and the locking arm section, at which the cam follower is provided.

A still further object of the invention as claimed in claim 5 is to provide a lock section structure wherein the unlocking button, the cam follower and the lock pivot shaft are arranged in series along the pushing direction.

Effects of the Invention

According to the invention as claimed in claim 1, the following operational effects can be obtained.

Concretely, the lock member is provided as the pivotable member. With this, the opening direction of the opening and closing member under the closed state and the direction of the accepting portion and the engaging surface can be arranged perpendicular to each other without being affected by the layout (e.g. the position of the opening/closing center axis portion of the opening and closing member, the opening direction starting from the closed state, the position of the unlocking button, the pushing direction of the unlocking button and the like). Therefore, a reduction of a substantial engaging force and a reduction of an engaging amount, which should be caused when the opening direction of the opening and closing member under the closed state and the direction of the accepting portion and the engaging surface are not perpendicular to each other, are resolved. More specifically it becomes possible to establish the locked state certainly while preventing the accepting portion and the engaging surface from failing to engage.

Moreover, by providing the lock member as the pivotable member, a movable space of the lock member can be reduced as compared with a case of linearly moving the lock member to establish the lock or unlocked state. According to the reduced amount of the movable space, the size of the lock mechanism can be reduced.

Since the lock member is provided as the pivotable member, it becomes also possible to reduce a pushed amount of the unlocking button while increasing a movable range of the engaging surface by adjusting an arm ratio of the pivotable member (more specifically, a ratio between the distance from the lock pivot shaft to the cam mechanism (the under-mentioned cam follower) and the distance from the cam mechanism to the engaging surface). In other words, it becomes possible to ensure a high engaging amount between the accepting portion and the engaging surface while decreasing the pushed amount of the unlocking button. Additionally, it is also possible to reduce an operation noise while decreasing the pushed amount of the unlocking button to improve an operational feeling.

According to the invention as claimed in claim 2, the following operational effects can be obtained.

Concretely, when an operator backwardly downwardly pushes the unlocking button disposed on the upper side of the opening and closing member that forms a vertical surface, the locked state having been achieved by the lock mechanism in released, and the opening and closing member is forwardly and downwardly pivoted by its own weight or the like about the opening/closing center axis portion disposed at the backward position, thereby allowing the opening and closing member to open.

On the contrary, when the opening and closing member is forwardly and upwardly pivoted about the opening/closing center axis portion and fitted into the opening, locking is achieved by the lock mechanism.

In a case of moving the lock member linearly in order to establish the locked or unlocked state, the engaging surface of the lock member and the accepting portion of the opening and closing member should be difficult to (or can hardly) have a surface perpendicular to the opening direction toward which the opening and closing member under a closed state can open pivotally about the opening/closing center axis portion. However, by providing the lock member as the pivotable member, it becomes possible even in such cases to let the engaging surface of the lock member and the accepting portion of the opening and closing member have a surface perpendicular to the opening direction toward which the opening and closing member under a closed state can open pivotally about the opening/closing center axis portion.

According to the invention as claimed in claim 3, the following operation effects can be obtained.

Concretely, it becomes possible to provide a concrete configuration capable of implementing the above-mentioned lock mechanism. In such a lock mechanism, the lock member is pivotably supported by (a bearing part of) a holder member attached onto the storage device body, through the lock pivot shaft.

The cam follower constituting the cam mechanism is disposed on the lock member at a location forward from a part pivotally supported by the lock pivot shaft. When the unlocking button is pushed, the cam follower is guided on the cam surface of the cam plate located backside the unlocking button and extending in the pushing direction, and then the lock member is pivotally moved in the unlocking direction against a biasing force of the biasing member, thereby achieving unlocking.

The biasing member is provided to interpose between the storage device body or the holder member and the lock member; therefore, once releasing the unlocking button from pushing, the lock member comes back in the locking direction by the biasing force of the biasing member thereby being brought into a state ready for locking.

According to the invention as claimed in claim 4, the following operational effects can be obtained.

Concretely, the lock member takes, in a side view, a mountain-like shape having the bearing section and the locking arm section. With this, it becomes possible to take a shape convenient for making the direction of the accepting portion and that of the engaging surface perpendicular to the opening direction toward which the opening and closing member under a closed state can open. Additionally, it is also possible to determine the direction of the accepting portion and the engaging surface arbitrarily.

With this shape, it becomes possible to minimize structural limitations affected by the layout (e.g. the position of the opening/closing center axis portion of the opening and closing member, the opening direction starting from the closed state, the position of the unlocking button, the pushing direction and the like). In addition, by locating the cam follower at the bending section between the bearing section and the locking arm section, it becomes possible to let the lock member have a more rational shape, so that the design thereof can be made easier.

According to the invention as claimed in claim 5, the following operational effects can be obtained.

Concretely, an installation space and a movable range of the lock member can be minimized as far as possible. According to the minimized amount, the size of the lock mechanism can be reduced.

MODE(S) FOR CARRYING OUT THE INVENTION

Referring now to the accompanying drawings, modes for carrying out the invention and Examples behaving as embodiments thereof will be discussed in detail.

Figure 1:
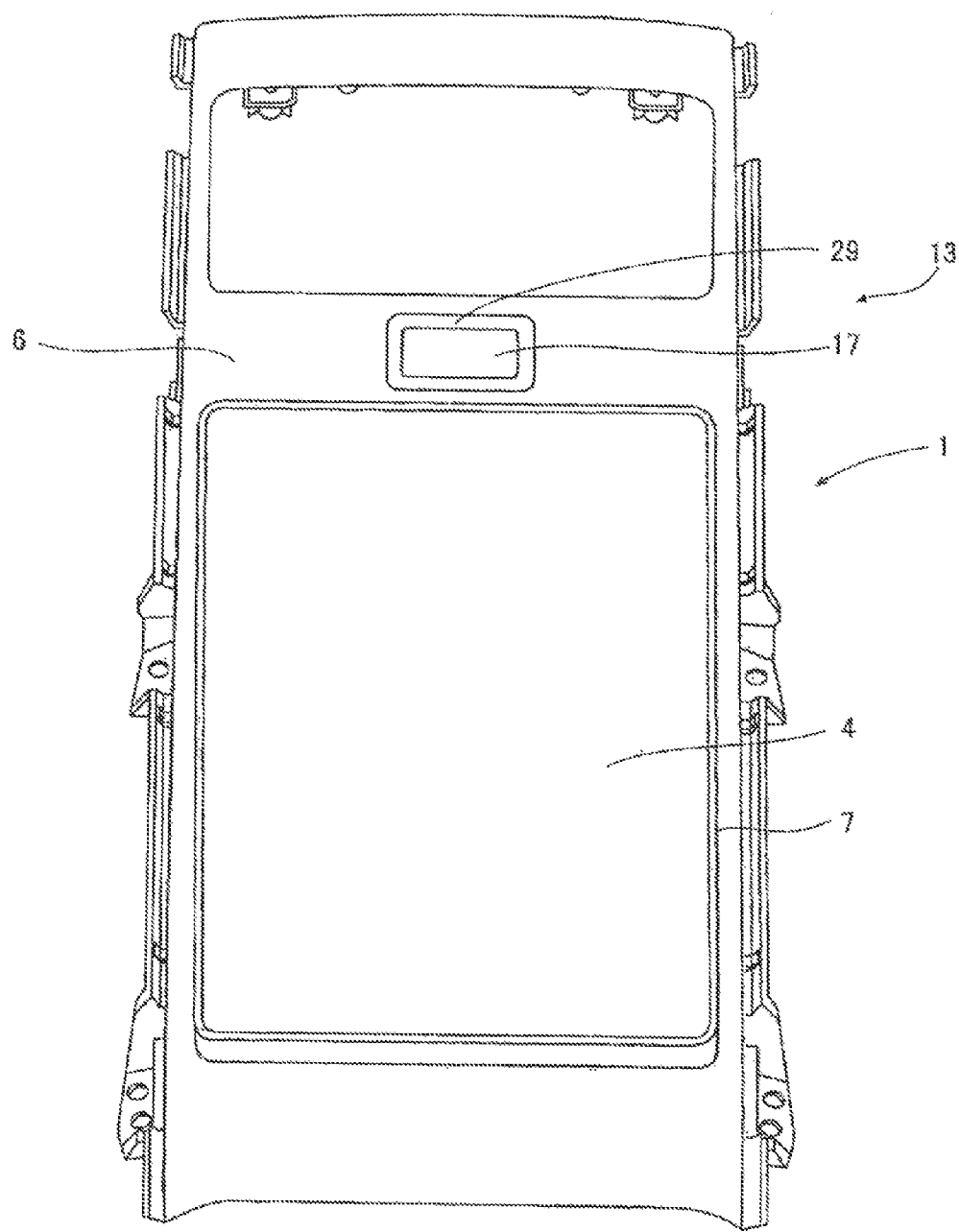
FIG. 1 A front view of a storage device having a lock section structure according to an embodiment of the present invention.
Figure 2:
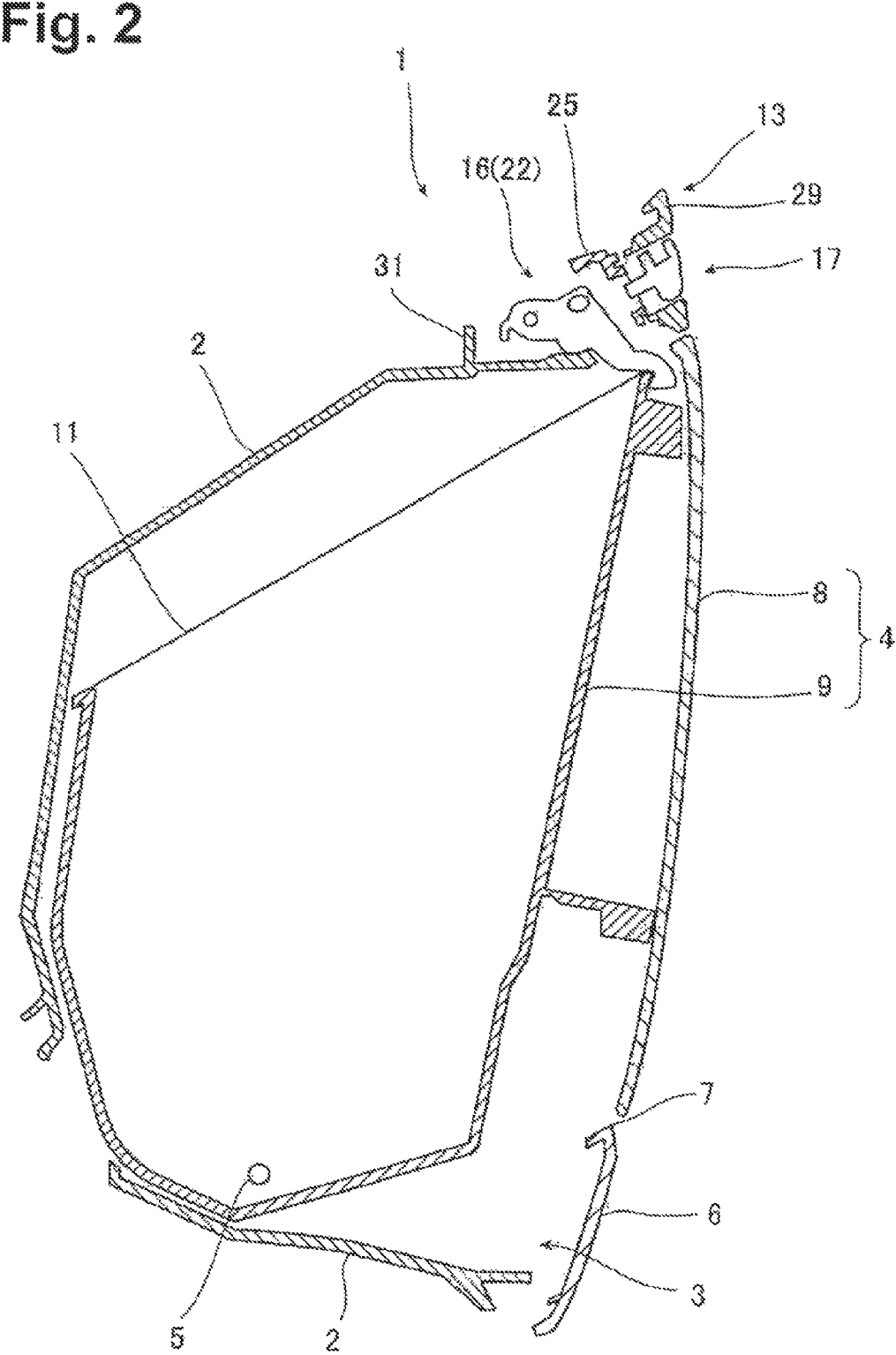
FIG. 2 A sectional side view of FIG. 1.
Figure 3:
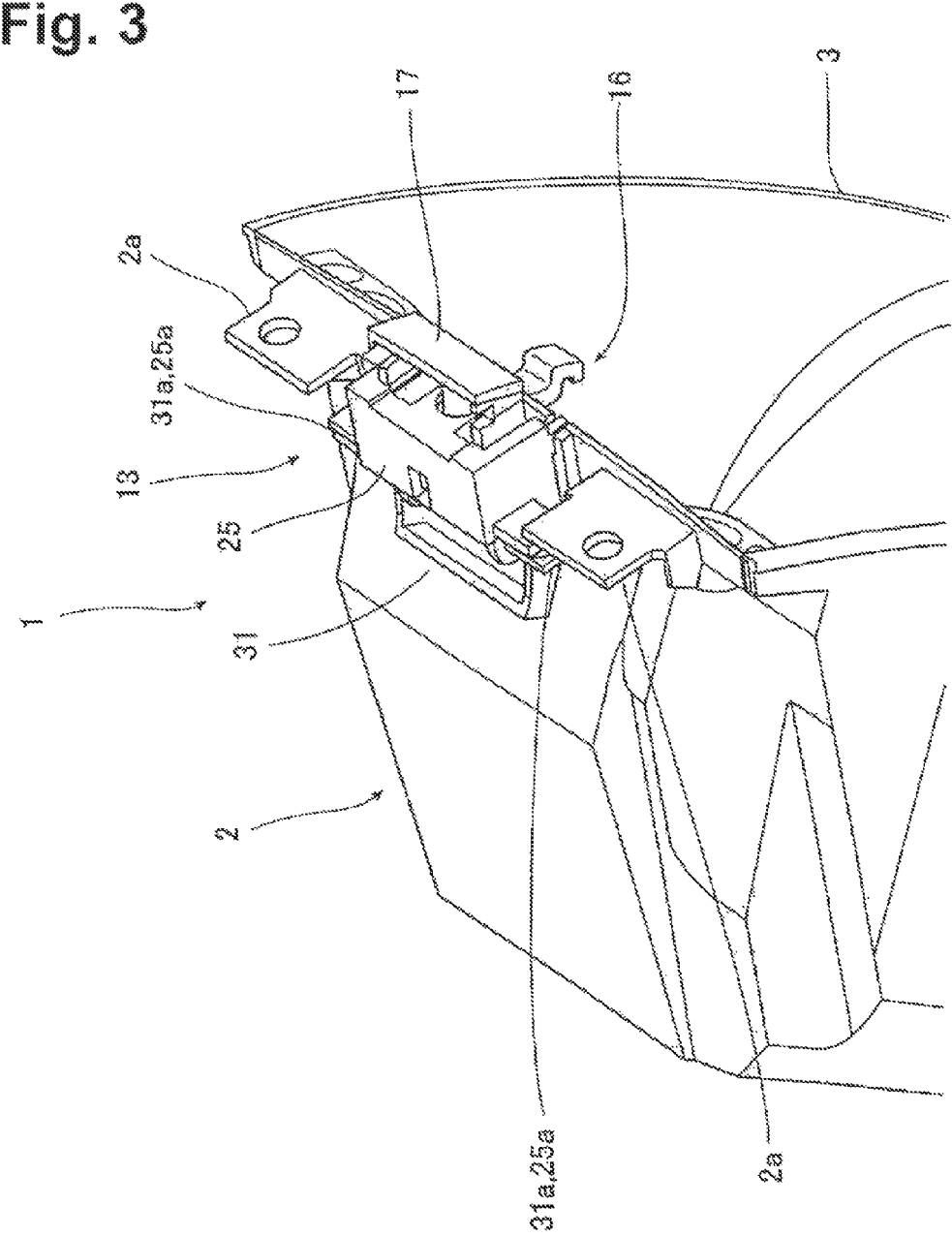
FIG. 3 A perspective view of an upper portion of a storage device body which upper portion includes a main part of a lock mechanism illustrated in FIG. 2.
Figure 4:
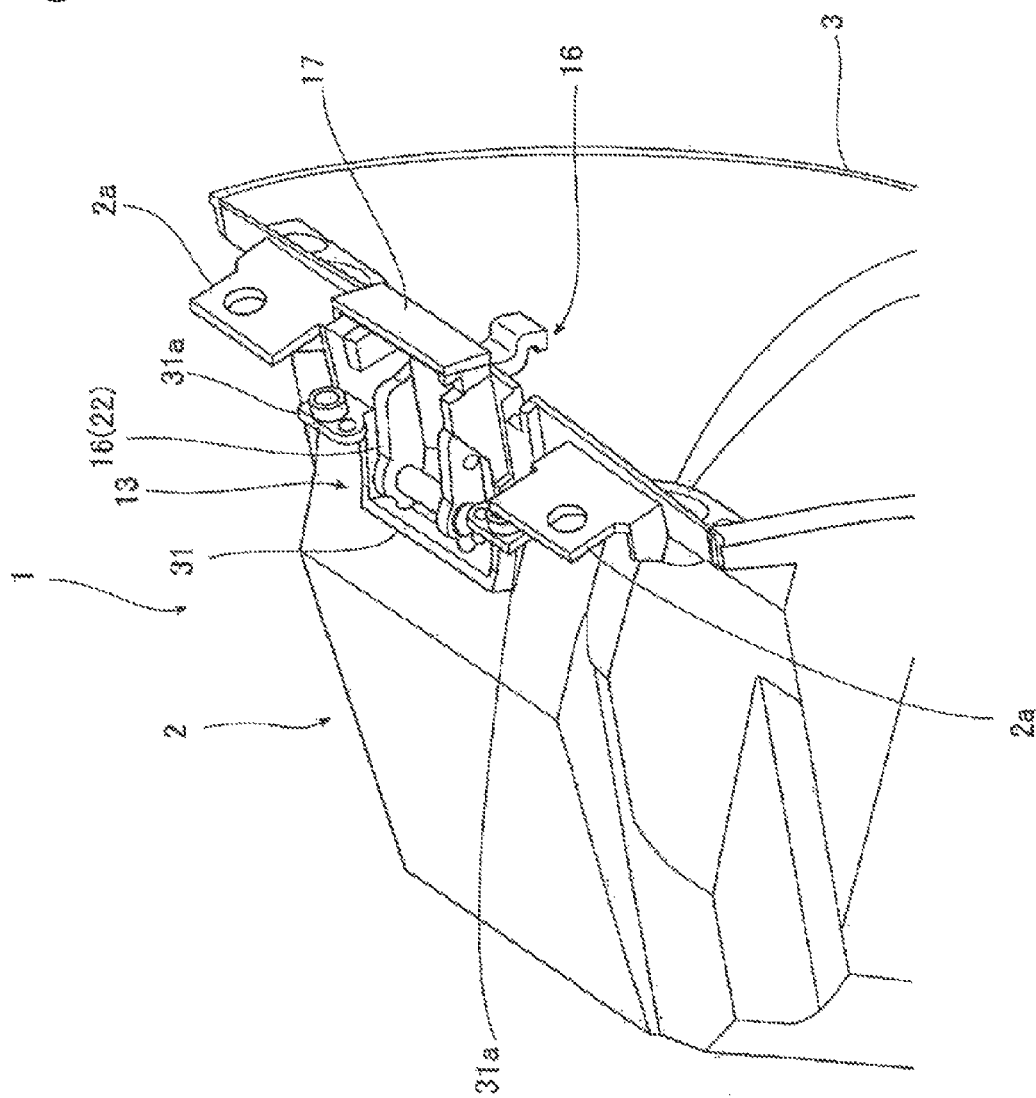
FIG. 4 A perspective view similar to FIG. 3 but showing a state in which a holder member has been removed.
Figure 5:
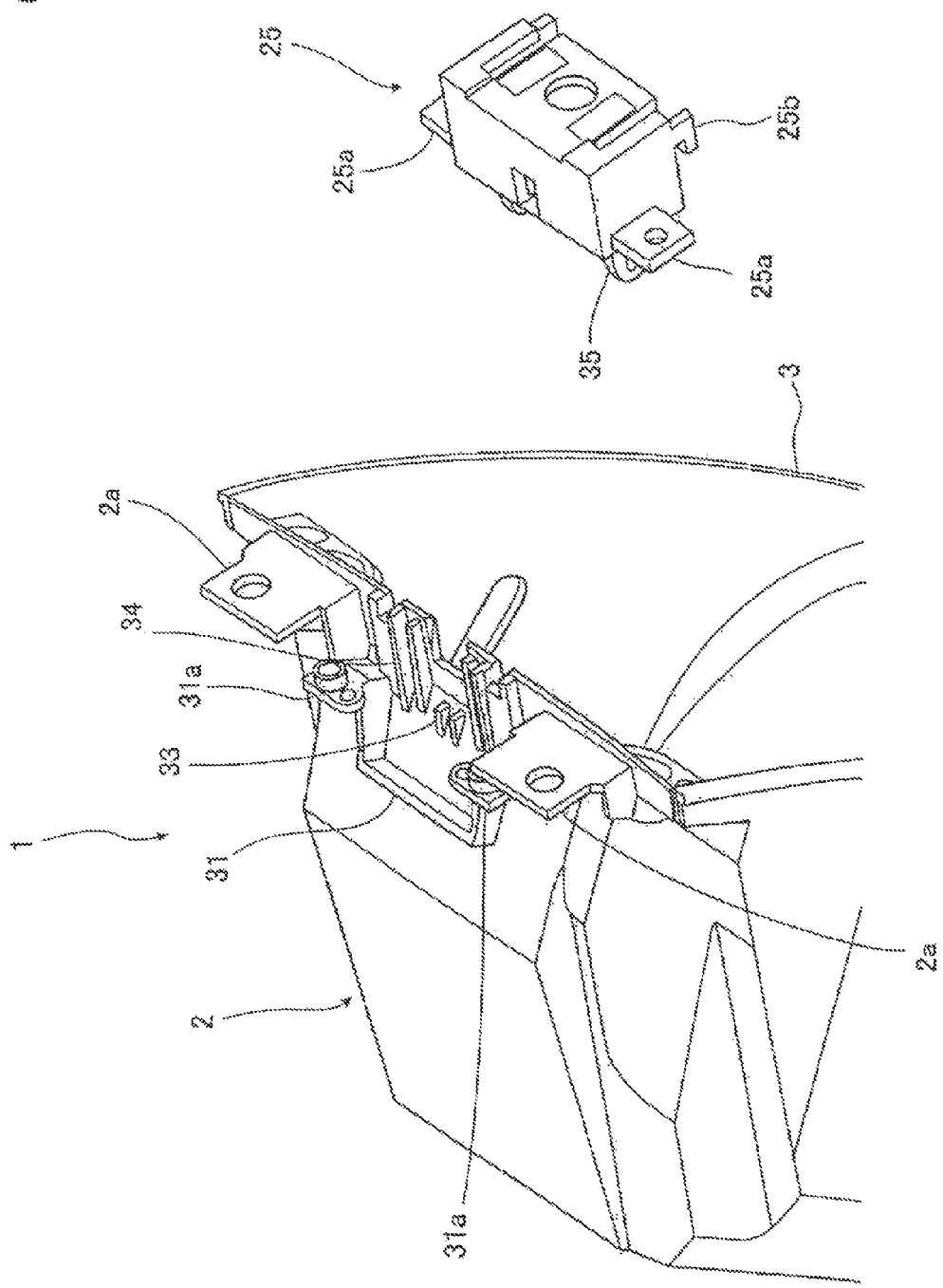
FIG. 5 A perspective view similar to FIGS. 3 and 4 but showing a state in which a lock member and an unlocking button have been removed.

FIGS. 1 to 9 are showing Examples and variations thereof. Of these, FIGS. 1 and 2 are general views. FIGS. 3 to 5 are partial enlarged perspective views. FIGS. 6 to 9 are detail drawings.

For example, a storage device 1 is disposed at a part of an interior of a vehicle such as an automotive vehicle (see FIGS. 1 and 2).

As shown in FIG. 2, the storage device 1 is composed of at least a storage device body 2 and an opening and closing member 4 which can open or close an opening 3 with which the storage device body 2 is formed. The storage device body 2 and the opening and closing member 4 are supported so as to be capable of pivoting about an opening/closing center axis portion 5 disposed on one side.

Hereinafter, supplemental explanations will be made about direction. The term "forward" is defined as meaning a side closer to an operator, while the term "backward" is defined as meaning a side farther from the operator. In the case where the storage device 1 has been mounted on the vehicle, for an example, a rearward direction in the front-rear direction of the vehicle corresponds to the term "forward" while a frontward direction in the front-rear direction of the vehicle corresponds to the term "backward". In addition, the vehicle width direction corresponds to the width direction or horizontal direction if the storage device 1. Concerning the vertical direction, the storage device 1 and the vehicle coincide with each other.

The above-mentioned "storage device 1" is mainly assumed to be for use in vehicles but not limited to be for use in vehicles. Although in assumed cases the storage device 1 serves as a glove compartment for passengers on the back seat which glove compartment is disposed on the rear side of a console box of the vehicle or at a rear cover 6, it is not limited to the glove compartment and usable as a glove box for passengers on the front seat, a storage device 1 for other uses, or the like.

The above-mentioned "storage device body 2" is disposed backward the above-mentioned rear cover 6. The storage device body 2 is assumed to be of a box type having a recessed shape concave toward the front of the vehicle when viewed from the side of the vehicle (see FIGS. 3 to 5). The storage device body 2 is provided to have an attaching portion 2a for attaching the storage device body 2 to a body of the console box, and an attaching portion for attaching the above-mentioned rear cover 6 to the storage device body 2. The rear cover 6 behaves as a design surface of the storage device body 2 when attached to the forward side of the storage device body 2.

The above-mentioned "opening 3" is defined at a forward part of the storage device body 2. Incidentally, the rear cover 6 is formed with an opening 7 at a position corresponding to the opening 3 (see FIG. 2). In this case, the opening 3 is defined to extend more downwardly than the opening 7. Additionally, the openings 3 and 7 are defined to have a rectangular shape in a plan view, extending generally in the vertical direction and generally in the horizontal direction. However, the shapes of the openings 3 and 7 are not limited to those.

The above-mentioned "opening and closing member 4" is provided to include an outer member 8 constituting a design surface on the forward side, and an inner member 9 attached integral with the outer member 8 on the backward of the outer member 8. The outer member 8 has a shape generally similar to or somewhat smaller than that of the opening 7 of the rear cover 6, and more particularly, a rectangular shape moderately fitting in the opening 7. Moreover, the inner member 9 is provided integral with a storage section 11. The storage section 11 is formed to open at its top portion. However, the storage section 11 may be provided on the side of the storage device body 2.

The above-mentioned "one side" may be either an upper side or a lower side of both the storage device body 2 and the opening and closing member 4, or may be either a right side or a left side of both the storage device body 2 and the opening and closing member 4. In the case as mentioned below, "one side" is located on the lower side.

The above-mentioned "opening/closing center axis portion 5" is provided extending in the horizontal direction (or the width direction of the storage device body 2). The opening/closing center axis portion 5 may be equipped with a speed reduction mechanism for adjusting an opening speed, though not particularly shown. Additionally, the opening/closing center axis portion 5 is composed of an axial section provided to either one of the storage device body 2 and the opening and closing member 4 and a bearing section provided to the other, though not shown.

In the storage device 1, a lock mechanism 13 allowing locking and unlocking is provided on the other side of both the storage device body 2 and the opening and closing member 4.

Figure 6:
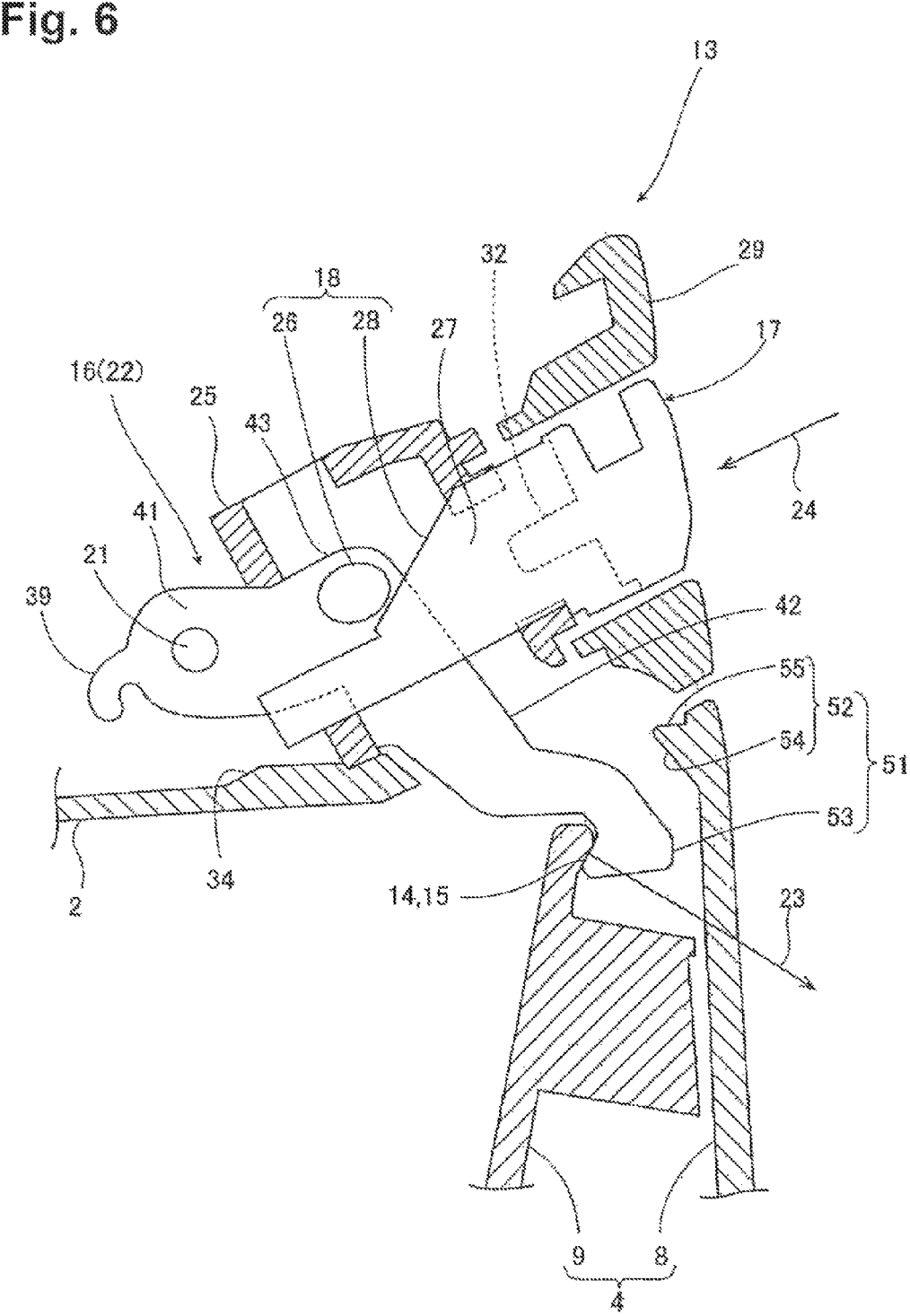
FIG. 6 A partial enlarged sectional side view of the lock mechanism of FIG. 2.
Figure 7:
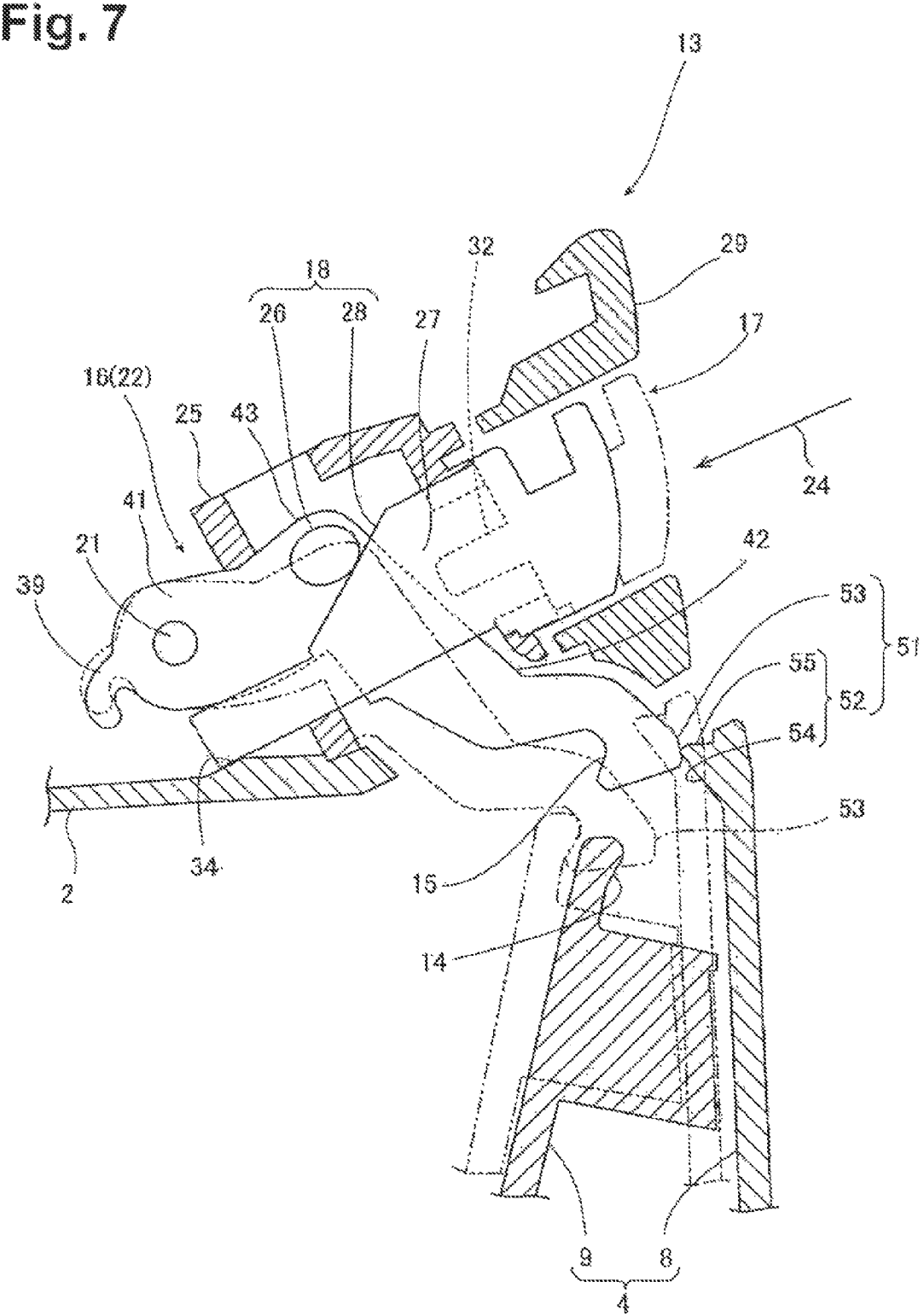
FIG. 7 A view similar to FIG. 6 but showing an operating state.

As shown in FIG. 6 (to FIG. 9), the lock mechanism 13 may include: a lock member 16 having an engaging surface 15 at which the lock member 16 can engage with or disengage from an accepting portion 14 provided to the opening and closing member 4; an unlocking button 17 capable of being pushed against the storage device body 2; a cam mechanism 18 adapted to disengage the lock member 16 from the accepting portion 14 by a push of the unlocking button 17; and a biasing member 19 (shown in FIG. 8) for constantly biasing the lock member 16 toward a locking direction.

By the way, "the other side" is defined as a side opposite to the "one side" discussed in the above supplemental explanations, and more specifically, it may be either a lower side or an upper side of both the storage device body 2 and the opening and closing member 4, or may be either a right side or a left side of both the storage device body 2 and the opening and closing member 4. In the case as mentioned below, "the other side" is located on the upper side.

The above-mentioned "lock mechanism 13" is literally a mechanism for locking the opening and closing member 4 at the storage device body 2 or unlocking the same. In the present case, the lock mechanism 13 is disposed at the center in the horizontal direction, on the other side defined as above.

The above-mentioned "accepting portion 14" is provided for receiving the engaging surface 15 (or an engaging portion) of the lock member 16. The accepting portion 14 is formed at a top edge portion of the inner member 9 so as to face toward the outer member 8, with a slightly modified thickness.

The above-mentioned "engaging surface 15" that the lock member 16 has at its end (a forward end) is located at a bottom surface facing to the accepting portion 14. By cooperation between the accepting portion 14 and the engaging surface 15, there is provided an engaged section for establishing a locked state.

The above-mentioned "lock member 16" is a movable member having the engaging surface 15 at its end so as to directly engage with the accepting portion 14 of the opening and closing member 4. In order not to expose to the outside, the lock member 16 is housed in the interior (or the backward) of the storage device 1.

The above-mentioned "unlocking button 17" is an operating switch for operating the lock member 16 from the outside. The unlocking button 17 has a pushing surface that forms an almost same surface together with the surface of the storage device body 2 (or the rear cover 6).

The above-mentioned "cam mechanism" in the present case serves as a guiding mechanism or operational movement-converting mechanism adapted to bring the unlocking button 17 and the lock member 16 into slidable contact with each other so as to convert the pushed motion of the unlocking button 17 into an unlocking motion of the locking member 16.

The above-mentioned "locking direction" means a direction where the engaging surface 15 engages with the accepting portion 14.

The above-mentioned "biasing member 19" is a member for bringing the lock member 16 and the unlocking button 17 back to the locked state by elastic force. Elastic members such as a spring and a rubber may be used as the biasing member 19. The biasing member 19 is to directly bias at least one of the lock member 16 and the unlocking button 17.

Example 1

<Configuration>

Hereinafter, explanations will be made about configuration.

A lock section structure discussed in Example 1 is provided with a configuration as discussed below.

(Configuration 1)

The lock member 16 is composed of a pivotable member 22 pivotable about a lock pivot shaft 21.

The engaging surface 15 of the lock member 16 and the accepting portion 14 of the opening and closing member 4 form a plane perpendicular to an opening direction 23 (see FIG. 6) toward which the opening and closing member 4 under a closed state can open about the opening/closing center axis portion 5.

(Supplemental Explanation 1)

The above-mentioned "lock pivot shaft 21" is an axial part behaving as the center of the pivotal movement of the lock member 16 (i.e., the pivotable member 22). In the present case, the lock pivot shaft 21 is provided extending in the horizontal direction.

The above-mentioned "pivotable member 22" is literally a member (or a pivotably locking member) for establishing the locked or unlocked state by its pivotal movement. In the present case, an upward pivotal movement of the engaging surface 15 about the lock pivot shaft 21 serves as a movement achieving the unlocked state, while a downward pivotal movement of the engaging surface 15 about the lock pivot shaft 21 serves as a movement achieving the locked state.

The above-mentioned "opening direction 23 starting from the closed state" is literally a direction toward which the opening and closing member 4 starts to open from the closed state. More specifically, the opening direction 23 starting from the closed state is also a direction along a tangential line of a circle so circumscribed about the opening/closing center axis portion 5 as to pass an end (or a top end) of the other side of the opening and closing member 4 under the closed state.

The term "perpendicular plane" means a plane direction perpendicular to the above-mentioned tangential direction (i.e., the opening direction 23). However, "perpendicular" is not limited only to an angle of 90° and it may include angles approximate thereto.

(Configuration 2)

The opening and closing member 4 forms a vertical surface (as shown in FIGS. 1 and 2).

The opening and closing member 4 is locked at its upper side by the lock mechanism 13 when downwardly pivoted about the opening/closing center axis portion 5 disposed on the lower side.

Since the opening/closing center axis portion 5 is located on the backward side in the storage device body 2, the opening direction 23 toward which the opening and closing member 4 under a closed state can open is directed forwardly downwardly.

Furthermore, a pushing direction 24 of the unlocking button 17 is backwardly downwardly as shown in FIG. 6.

(Supplemental Explanation 2)

The above-mentioned "vertical surface" is a surface extending generally in the vertical direction and the horizontal direction. However, the vertical direction is not limited to a very vertical one and it may widely refer to those having an angle inclined to an extent reasonably regarded as being vertical. Moreover, the vertical surface is not limited to a plane and it may include such surfaces as to be approximately regarded as being planar (for example, gently arcuate or spherical surfaces and the other free-form surfaces).

The above-mentioned "pushing direction 24" is a direction toward which the unlocking button 17 is pushed to release lock. Though in general the pushing direction 24 is perpendicular to the surface of the storage device body 2 (i.e., the rear cover 6), it is defined in the present case to be downward and not to be perpendicular, for operational easiness for passengers.

(Configuration 3)

The lock mechanism 13 is provided to have a holder member 25 attachable to the storage device body 2 (see FIG. 5).

The holder member 25 allows the lock pivot shaft 21 to be pivotally supported.

Additionally, a cam follower 26 constituting the cam mechanism 18 is disposed on the lock member 16 at a location forward from a part pivotally supported by the lock pivot shaft 21, as shown in FIG. 6.

The unlocking button 17 has at its backward position, a cam plate 27 extending in the pushing direction 24.

The cam plate 27 is formed with a cam surface 28 for guiding the cam follower 26 with respect to the cam plate 27 to rotationally move the lock member 16 toward an unlocking direction.

Figure 8:
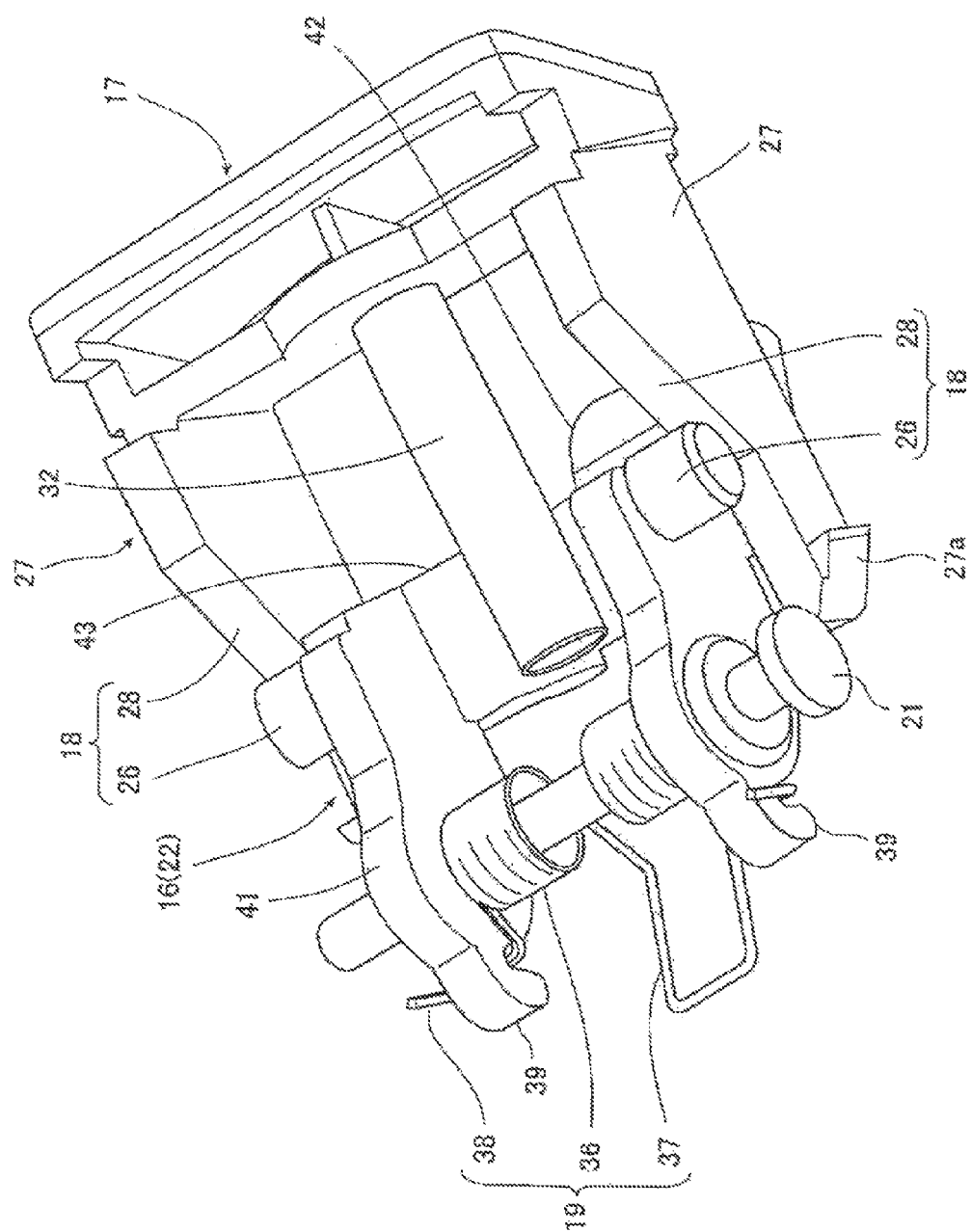
FIG. 8 A perspective view of the lock member and the unlocking button, taken from an obliquely upward direction.

Furthermore, the biasing member 19 is provided to interpose between the storage device body 2 or the holder member 25 and the lock member 16, as shown in FIG. 8.

(Supplemental Explanation 3)

By the way, the above-mentioned "holder member 25" is a holing member for assembling the lock member 16, the unlocking button 17 and the like, easily attachable to the storage device body 2.

Figure 9:
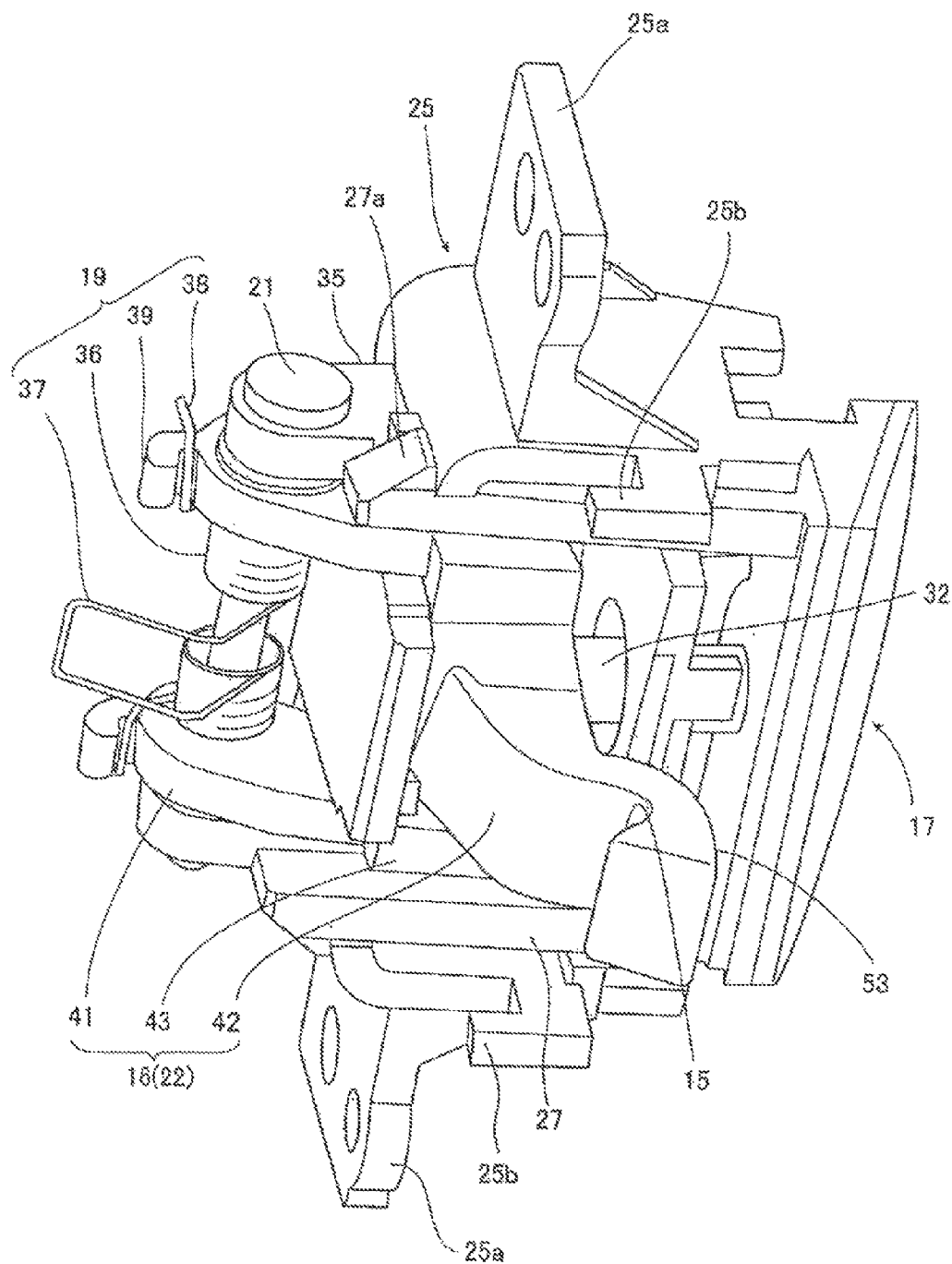
FIG. 9 A perspective view of the lock member and the unlocking button, taken from an obliquely downward direction.

The holder member 25 (as shown in FIGS. 5, 6 and 9 etc.) has an upper surface, left and right surfaces, a forward surface and a backward surface and opens at its bottom side, and therefore takes a box-like shape.

The holder member 25 is fixed onto a holder emplacement 31 provided on the upper surface of the storage device body 2 by fastening, for example (see FIG. 5 etc.).

Hence the holder member 25 and the holder emplacement 31 are provided respectively with fastening parts 25a and 31a at which fasteners are attachable from forward to backward.

Additionally, the holder member 25 is provided to have, at its bottom side, an engaging part 25b engageable with a forward end of the upper surface of the storage device body 2.

The above-mentioned holder emplacement 31 includes a guide rod 32 integrally projectingly formed extending from (almost the center of) a backward surface of the unlocking button 17 to the pushing direction (as shown in FIG. 8); and guide sections 33, 34 for guiding the cam plate 27 or stopping the cam plate 27 at the maximum pushed position (as shown in FIG. 5).

Moreover, the holder member 25 is formed having at its backward surface a slit for inserting the cam plate 27 and the lock member 16 thereinto, though not shown.

Furthermore, the holder member 25 includes a bearing part 35 for rotatably supporting the lock pivot shaft 21, at its backward side.

Still further, the holder member 25 is provided to have at its forward side a decorative frame 29 enclosing the periphery of the unlocking button 17 and forming the same surface together with the surface of the rear cover 6 (as shown in FIGS. 1, 2 and 6).

The above-mentioned "cam follower 26" in the present case may be a cylindrical or elliptical column extending in the horizontal direction as shown in FIGS. 6 and 8. However, the shape of the cam follower 26 is not limited to those.

A pair of the above-mentioned "cam plate 27" are provided extending from both sides of the unlocking button 17 so as to be parallel with each other. The above-mentioned cam follower 26 is also provided as a pair at horizontal positions, respectively.

At the backward ends of the cam plates 27, positioning claws which can engage with the backward ends of the both surfaces of the holder member 25 thereby positioning the pushed surface of the unlocking button 17 so as not to protrude forwardly from the location almost the same as the surface of the storage device body 2 are formed (see FIGS. 8 and 9).

The above-mentioned "cam surface 28" in the present case is formed in such a manner as to cut an upper edge of the cam plate 27 off. The cam surface 28 includes a backwardly downwardly inclined surface. The above-mentioned cam follower 26 is so disposed as to contact with the cam surface 28.

The above-mentioned "biasing member 19" is defined in the present case as being a torsion spring or the like obtained by fitting a coil portion 36 (a winding portion) onto the lock pivot shaft 21. An one end portion 37 extending from the coil portion 36 of the torsion spring is engaged with the storage device body 2 for the holder member 25). Meanwhile, the other end portion 38 also extending from the coil portion 36 of the torsion spring is engaged with a spring-engaging section 39 that the lock member 16 has at its backward end. In the present case, the torsion spring is provided as a left and right pair and their one end portions are connected to each other.

(Configuration 4)

As shown in FIG. 6, the lock member 16 is provided to include at its backward part a bearing section 41 extending in the pushing direction 24 to support the lock pivot shaft 21.

In addition, the lock member 16 is provided to include at is forward part a locking arm section 42 extending toward the above-mentioned accepting portion 14 while having the engaging surface 15 at its end (a forward end). Therefore, the lock member 16 takes a mountain-like shape in a side view.

The lock member 16 taking a mountain-like shape in a side view has a bending section 43 between the bearing section 41 and the locking arm section 42, at which the above-mentioned cam follower 26 is provided.

(Supplemental Explanation 4)

The above-mentioned term phrase "extending in the pushing direction 24" encompasses a direction parallel to the pushing direction 24 and directions approximate to the pushing direction 24. In the present case, the bearing section 41 is provided to slightly upwardly extend with respect to the pushing direction 24.

The above-mentioned "bearing section 41" is literally a section for supporting the lock pivot shaft 21. However, the bearing section 41 may be one integrally provided with the lock pivot shaft 21 and may be one to which the lock pivot shaft 21 is independently attachable.

In the present case, the bearing section 41 is provided as a left and right pair. The left and right bearing sections 41 are located inside the above-mentioned left and right cam plates 27.

The above-mentioned phrase "extending toward the above-mentioned accepting portion 14" can involve directions little deviating from the accepting portion 14. Furthermore, the direction is not limited to a linearly extending one and encompasses directions extending in the slightly bending state and the like.

The above-mentioned "locking arm section 42" is singly formed at a position between the left and right bearing sections 41.

The above-mentioned phrase "takes a mountain-like shape in a side view" means that the bearing section 41 and the locking arm section 42 does not form a linear shape but forms a bending shape when viewed from side. The mountain-like shape in a side view can involve a triangular shape, a shape of "へ" of Japanese character and shapes approximate to these.

The above-mentioned "bending section 43" is a section where the left and right pair of bearing sections 41 and the single locking arm section 42 in a branched state are joined, at which a horizontally extending link section is provided. Around the bending section 43 and on the outer surfaces of sections respectively continuing from the left and right bearing sections 41, the above-mentioned follower 26 is integrally protrudingly formed in the horizontal direction.

(Configuration 5)

The unlocking button 17, the cam follower 26 and the lock pivot shaft 21 are arranged in series along the pushing direction 24.

(Supplemental Explanation 5)

The above-mentioned phrase "in series" involves both a completely linear arrangement and a generally linear arrangement. In the present case, the arrangement is an incompletely linear one. More specifically, the cam follower 26 and the lock pivot shaft 21 are disposed such that their centers are biased little upward the vertical center of the unlocking button 17 (or toward a direction apart from the engaging surface 15).

(Configuration 6)

As mentioned above, the lock member 16 serves as a pivotable member 22 pivotable about the lock pivot shaft 21.

Between the opening and closing member 4 and the lock member 16, a compulsorily opening mechanism 51 for compulsorily opening the opening and closing member 4 is provided.

(Supplemental Explanation 6)

The above-mentioned "lock pivot shaft 21" is a shaft serving as a center of the pivotal movement of the lock member 16 (the pivotable member 22). In the present case, the lock pivot shaft 21 is defined to be one extending in the horizontal direction.

The above-mentioned "pivotable member 22" is literally a member for establishing the locked or unlocked state by its pivotal movement. In the present case, an upward pivotal movement of the engaging surface 15 about the lock pivot shaft 21 serves as a movement achieving the unlocked state, while a downward pivotal movement of the engaging surface 15 about the lock pivot shaft 21 serves as a movement achieving the locked state.

The above mentioned "compulsorily opening mechanism 51" is literally a mechanism for compulsorily opening the opening and closing member 4. The compulsorily opening mechanism 51 will be discussed below in detail.

(Configuration 7)

The compulsorily opening mechanism 51 is formed inside the opening and closing member 4, and includes a pressure receiving portion 52 which is to be pressed in the opening direction when the lock member 16 is pivoted in the unlocking direction.

(Supplemental Explanation 7)

The above-mentioned "pressure receiving portion 52" is provided on the side of the inner surface of (the top end of) the outer member 8 of the opening and closing member 4. The pressure receiving portion 52 is adapted to be pushed by a contact portion 53 formed at a portion locating opposite to the engaging surface 15 of the lock member 16, after unlocking is achieved.

More specifically, the compulsorily opening mechanism is so configured as to attain a compulsory opening of the opening and closing member 4 by the pressure receiving portion 52 and the contact portion 53 when the opening and closing member 4 cannot open.

The pressure receiving portion 52 is formed at a position or a height with which the top end of the lock member 16 is brought into contact when the opening and closing member 4 cannot open even after unlocking is achieved. However, if the opening and closing member 4 opens smoothly, the contact portion 53 of the lock member 16 is not necessarily brought into contact with the pressure receiving portion 52.

The pressure receiving portion 52 is provided to have a height (or a projecting amount) slightly larger than the thickness of (the outer member 8 of) the opening and closing member 4. The pressure receiving portion 52 is disposed at a height equal to an amount intended to compulsorily open the opening and closing member 4.

(Configuration 8)

The above-mentioned pressure receiving portion 52 is provided to have on one side a slidably pressed surface 54 onto which the lock member 16 is slidably pressed, and on the other side a hook portion 55 that functions as a hook.

(Supplemental Explanation 8)

The above-mentioned "slidably pressed surface 54" may be an inclined surface for converting the pivotal movement of the lock member 16 into the opening movement of the opening and closing member 4. In the present case, it is defined as an inclined surface formed at a lower part of the pressure receiving portion 52 and inclining backwardly upwardly, or the like.

The above-mentioned "hook portion 55" is formed in such a manner as to cut an upper part of the pressure receiving portion 52 off.

<Operation>

The above-mentioned embodiment is operated as follows.

When an operator backwardly downwardly pushes the unlocking button 17 disposed on the upper side of the opening and closing member 4 serving as a vertical surface, the locked state having been achieved by the lock mechanism 13 is released, and the opening and closing member 4 is forwardly and downwardly pivoted by its own weight or the like about the opening/closing center axis portion 5 disposed at the backward position, thereby allowing the opening and closing member 4 to open.

On the contrary, when the opening and closing member 4 is forwardly and upwardly pivoted about the opening/closing center axis portion 5 and fitted into the opening 3, locking is achieved by the lock mechanism 13.

<Effects>

According to the present embodiment, the following operational effects can be obtained.

(Operational Effect 1)

The lock member 16 is composed of the pivotable member 22. With this, the opening direction 23 of the opening and closing member 4 under the closed state and the direction of the accepting portion 14 can be arranged perpendicular to each other without being affected by the layout (e.g. the position of the opening/closing center axis portion 5 of the opening and closing member 4, the opening direction 23 starting from the closed state, the position of the unlocking button 17, the pushing direction 24 and the like). Therefore, a reduction of a substantial engaging force and a reduction of an engaging amount, which should be caused when the opening direction 23 of the opening and closing member 4 under the closed state and the direction of the accepting portion 14 is not perpendicular to each other, are resolved. More specifically it becomes possible to establish the locked state certainly while preventing the accepting portion 14 and the engaging surface 15 from failing to engage.

Moreover, by providing the lock member 16 as the pivotable member 22, a movable space of the lock member 16 can be reduced as compared with a case of linearly moving the lock member 16 to establish the lock or unlocked state. According to the reduced amount of the movable space, the size of the lock mechanism 13 can be reduced.

Since the lock member 16 is provided as the pivotable member 22, it becomes possible to reduce a pushed amount of the unlocking button 17 while increasing a movable range of the engaging surface 15 by adjusting an arm ratio of the pivotable member 22 (more specifically, a ratio between the distance from the lock pivot shaft 21 to the cam mechanism 18 (the cam follower 26) and the distance from the cam mechanism 18 to the engaging surface 15). In other words, it becomes possible to ensure a high engaging amount between the accepting portion 14 and the engaging surface 15 while decreasing the pushed amount of the unlocking button 17. Additionally, it is also possible to reduce an operation noise while decreasing the pushed amount of the unlocking button 17 to improve an operational feeling.

(Operational Effect 2)

As mentioned above, the storage device 1 has a configuration where: the opening and closing member 4 forms a vertical surface (as shown in FIGS. 1 and 2); the opening and closing member 4 is locked at its upper side by the lock mechanism 13 when downwardly pivoted about the opening/closing center axis portion 5 disposed on the lower side; the opening direction 23 toward which the opening and closing member 4 under a closed state can open is directed forwardly downward; and the pushing direction 24 of the unlocking button 17 is backwardly downward as shown in FIG. 6. In a case of moving the lock member 16 linearly in order to establish the locked or unlocked state, the engaging surface 15 of the lock member 16 and the accepting portion 14 of the opening and closing member 4 are difficult to (or can hardly) have a surface perpendicular to the opening direction 23 toward which the opening and closing member 4 under a closed state can open pivotally about the opening/closing center axis portion 5; however, by providing the lock member 16 as the pivotable member 22, it becomes possible even in such cases to let the engaging surface 15 of the lock member 16 and the accepting portion 14 of the opening and closing member 4 have a surface perpendicular to the opening direction 23 toward which the opening and closing member 4 under a closed state can open pivotally about the opening/closing center axis portion 5.

(Operational Effect 3)

The lock mechanism 13 is provided to have the holder member 25 attachable to the storage device body 2 as shown in FIG. 5, and the holder member 25 allows the lock pivot shaft 21 to be pivotally supported. Additionally, the cam follower 26 constituting the cam mechanism 18 is disposed on the lock member 16 at a location forward from a part pivotally supported by the lock pivot shaft 21, as shown in FIG. 6. The unlocking button 17 has, at its backward position, the cam plate 27 extending in the pushing direction 24. The cam plate 27 is formed with the cam surface 28 for guiding the cam follower 26 with respect to the cam plate 27 to rotationally move the lock member 16 toward the unlocking direction. Furthermore, the biasing member 19 is provided to interpose between the storage device body 2 or the holder member 25 and the lock member 16 as shown in FIG. 8. With this, it becomes possible to provide a concrete configuration capable of implementing the above-mentioned lock mechanism 13.

In the lock mechanism 13 having the configuration as above, the lock member 16 is pivotably supported by (the bearing part 35 of) the holder member 25 attached onto the storage device body 2, through the lock pivot shaft 21.

The cam follower 26 constituting the cam mechanism 18 is disposed on the lock member 16 at a location forward from a part pivotally supported by the lock pivot shaft 21. When the unlocking button 17 is pushed, the cam follower 26 is guided on the cam surface 28 of the cam plate 27 located backside the unlocking button 17 and extending in the pushing direction, and then the lock member 16 is pivotally moved in the unlocking direction against a biasing force of the biasing member 19, thereby achieving unlocking.

The biasing member 19 is provided to interpose between the storage device body 2 or the holder member 25 and the lock member 16. Therefore, once releasing the unlocking button 17 from pushing, the lock member 16 comes back in the locking direction by the biasing force of the biasing member 19 thereby being brought into a state ready for locking.

(Operational Effect 4)

The lock member 16 takes, in a side view, a mountain-like shape having the bearing section 41 and the locking arm section 42. With this, it becomes possible to take a shape convenient for making the direction of the accepting portion 14 and that of the engaging surface 15 perpendicular to the opening direction 23 toward which the opening and closing member 4 under a closed state can open. Additionally, it is also possible to determine the direction of the accepting portion 14 and the engaging surface 15 arbitrarily.

With this shape, it becomes possible to minimize structural limitations affected by the layout (e.g. the position of the opening/closing center axis portion 5 of the opening and closing member 4, the opening direction 23 starting from the closed state, the position of the unlocking button 17, the pushing direction 24 and the like). In addition, by locating the cam follower 26 at the bending section 43 between the bearing section 41 and the locking arm section 42, it becomes possible to let the lock member 16 have a more rational shape, so that the design thereof can be made easier.

(Operational Effect 5)

The unlocking button 17, the cam follower 26 and the lock pivot shaft 21 are arranged in series along the pushing direction 24. With this, an installation space and a movable range of the lock member 16 can be minimized as far as possible. According to the minimized amount, the size of the lock mechanism 13 can be reduced.

(Operational Effect 6)

Between the opening and closing member 4 and the lock member 16 (or the pivotable member 22), the compulsorily opening mechanism 51 for compulsorily opening the opening and closing member 4 is provided. With this, it becomes possible, even in such a case that the opening and closing member 4 is hindered from opening by meeting with some articles inside the storage device 1, the opening and closing member 4 can compulsorily be opened by the compulsorily opening mechanism 51 provided between the opening and closing member 4 and the lock member 16.

(Operational Effect 7)

The lock member 16 pivoted in the unlocking direction is adapted to press the pressure receiving portion 52 (provided on the side of the inner surface of the opening and closing member 4) in the opening direction 23. Thus, the opening and closing member 4 can slightly be opened by the lock member 16.

With this arrangement, the opening and closing member 4 can certainly be opened even in such a case that the opening and closing member 4 is hindered from opening by meeting with some articles inside the storage device 1.

(Operational Effect 8)

The above-mentioned pressure receiving portion 52 is provided to have on one side the slidably pressed surface 54 onto which the lock member 16 is slidably pressed, and on the other side a hook portion 55 that functions as a hook. With this arrangement, it is possible to obtain operational effects as follows.

More specifically, when the lock member 16 is pivoted in the unlocking direction, (the contact portion 53 of) the lock member 16 presses the slidably pressed surface 54 (provided at the one side of the pressure receiving portion 52) outwardly while being brought into slidable contact with the slidably pressed surface 54 thereby allowing the opening and closing member 4 to open slightly. With this arrangement, it becomes possible to certainly define a slight gap for compulsorily opening the opening and closing member 4, even in such a case that the opening and closing member 4 is hindered from opening by meeting with some articles inside the storage device 1.

A slight gap is once defined between the storage device body 2 and the opening and closing member 4, it becomes possible to compulsorily open the opening and closing member 4 in the closed state by, for example, inserting a finger or a slim tool into the gap and pulling through the hook 55 by force. In this manner the article having hindered the opening and closing member 4 inside the storage device 1 can be taken out.

Although the invention has been described above with reference to the embodiments of the invention, the invention is not limited to such embodiments as described above since the embodiments are only for exemplifying the invention. It will be understood that modifications and variations of these embodiments may be carried out by those skilled in the art, in light of the above description. Furthermore, if each of the embodiments involves two or more configurations and if not particularly described, it will be understood that these configurations may be arbitrarily combined. Furthermore, in the case where two or more embodiments or variations are indicated, it will be understood that configurations somewhat covering them can be arbitrarily combined even if not particularly described. Furthermore, it will be understood that the configuration illustrated in the drawings is involved in the present invention even if not particularly described. Additionally, cases using the phase "and the like" mean that the invention involves equivalent matters. Additionally, cases using the phrases "almost", "approximately", "generally" and the like means that commonly acceptable ranges or accuracies are also involved in the present invention.

EXPLANATION OF REFERENCE NUMERALS

1 Storage device
2 Storage device body
3 Opening
4 Opening and closing member
5 Opening/closing center axis portion
13 Lock mechanism
14 Accepting portion
15 Engaging surface
16 Lock member
17 Unlocking button
18 Cam mechanism
19 Biasing member
21 Lock pivot shaft
22 Pivotable member
23 Opening direction
24 Pushing direction
25 Holder member
26 Cam follower
27 Cam plate
28 Cam surface
41 Bearing section
42 Locking arm section
43 Bending section

The invention claimed is:

1. A lock section structure, comprising:
a storage device comprising a storage device body and an opening and closing member adapted to open or close an opening with which the storage device body is formed, the storage device body and the opening and closing member being supported to be capable of pivoting about an opening/closing center axis portion disposed on one side that is either a lower side or an upper side, or either a left side or a right side, of both the storage device body and the opening and closing member; and
a lock mechanism for allowing locking and unlocking, provided on another side that is a side opposite to the one side;
wherein the lock mechanism comprises
a lock member having an engaging surface, at which the lock member is structured to engage with or disengage from an accepting portion provided to the opening and closing member,
an unlocking button capable of being pushed against the storage device body,
a cam mechanism adapted to disengage the lock member from the accepting portion by a push of the unlocking button, and
a biasing member for constantly biasing the lock member toward a locking direction,
wherein the lock member is structured as a pivotable member pivotable about a lock pivot shaft,
wherein the engaging surface of the lock member and the accepting portion of the opening and closing member form a plane perpendicular to an opening direction that is a direction toward which the opening and closing member starts to open from a closed state about the opening/closing center axis portion,
wherein the opening and closing member forms a surface extending generally in a vertical direction and a horizontal direction,
wherein the opening and closing member is arranged to downwardly pivot about the opening/closing center axis portion disposed on the lower side of both the storage device body and the opening and closing member,
wherein the opening and closing member is arranged to be locked at an upper side of the opening and closing member by the lock mechanism, wherein the opening/closing center axis portion is located on a backward side in the storage device body, to which an opening direction that is a direction toward which the opening and closing member starts to open from the closed state about the opening/closing center axis portion is directed forwardly and downwardly, wherein a pushing direction of the unlocking button is backwardly and downwardly, wherein the lock mechanism further comprises a holder member attachable to the storage device body, wherein the holder member allows the lock pivot shaft to be pivotally supported, wherein a cam follower comprising the cam mechanism is disposed on the lock member at a location forward from a part pivotally supported by the lock pivot shaft, wherein the unlocking button has, at a backward position of the unlocking button, a cam plate extending in the pushing direction, wherein the cam plate is formed with a cam surface including a surface inclined backwardly and downwardly, and being configured to guide the cam follower with respect to the cam plate to rotationally move the lock member toward an unlocking direction, and wherein the biasing member is provided to be interposed between the storage device body or the holder member and the lock member.

2. A lock section structure as claimed in claim 1, wherein:
the lock member is provided to include, at a backward part of the lock member, a bearing section extending in the pushing direction to support the lock pivot shaft, the lock member is further provided with, at a forward part of the lock member, a locking arm section extending toward the accepting portion while having the engaging surface at an end portion, thereby having a bent shape in a side view, and the lock member, which has the bent shape in the side view, has a bending section between the bearing section and the locking arm section, at which the cam follower is provided.

3. A lock section structure as claimed in claim 1, wherein the unlocking button, the cam follower and the lock pivot shaft are arranged in series along the pushing direction.

* * * * *